June 4, 1957 L. R. BOURGONJON ET AL 2,794,918

AUTOMATIC FREQUENCY CONTROL

Filed May 7, 1953

INVENTORS
LOUIS RAYMOND BOURGONJON
GUNNAR ARTUR EMIL GUNNARSSON WESTBECK

BY [signature]

AGENT

United States Patent Office
2,794,918
Patented June 4, 1957

2,794,918

AUTOMATIC FREQUENCY CONTROL

Louis Raymond Bourgonjon, Hilversum, Netherlands, and Gunnar Artur Emil Gunnarsson Westbeck, Stockholm, Sweden, assignors, by mesne assignments, to North American Philips Company, Inc., New York, N. Y., a corporation of Delaware Application May 7, 1953, Serial No. 353,582

Claims priority, application Netherlands May 17, 1952

7 Claims. (Cl. 250—36)

The present invention relates to transmission arrangements more particularly the invention relates to transmission arrangements comprising a transmission oscillator, the oscillations required to be transmitted being supplied to an antenna through a transmitter cascade. The said transmission arrangement comprises an automatic frequency control (AFC) device for automatic stabilization of the transmission oscillator frequency in view of the control frequency, more particularly in view of a component to be selected from the frequency spectrum of a pulsatory voltage by initial tuning of the oscillator. Said arrangement further comprises a search voltage generator which generates a search voltage acting to vary the transmission oscillator frequency, if stabilization thereof fails to occur.

In such transmission arrangements the use of say, click knobs for the initial tuning of the transmission oscillator permits the selecting of any one of a large number of possible transmission frequencies in a fraction of a second, whereupon automatic stabilization of the transmitter frequency ensues.

The object of the invention is to increase the usability of such transmitters in practice.

According to the invention in transmitters of the type described the transmitter cascade comprises blocking means adapted to be energized by the output voltage of the search voltage generator.

The blocking means may be constituted by a relay which is adapted to be energized by the search voltage and comprises a rest contact arranged in the transmitter cascade.

Preferably use is made of blocking means which are substantially inertia-free and comprise a rectifier which is connected to the search voltage generator. The direct current output-voltage of the rectifier is supplied as the blocking voltage to a grid of an amplifier tube included in the transmitter cascade.

According to a further feature of the invention, in transmission arrangements of the type concerned in so far as they comprise a listening-in device, to prevent the blocked transmission arrangement from being talked-into by its operator, which would cause portions of intelligence to become lost, provision is made of an audio-frequency alarm oscillator which is coupled to the listening-in device and is normally inoperative but is brought into operation by the output voltage of the search voltage generator. The alarm oscillator is preferably constituted by a glow discharge tube oscillator which has supplied to it as its energizing voltage the rectified and, if necessary, amplified search voltage.

Figure 1:
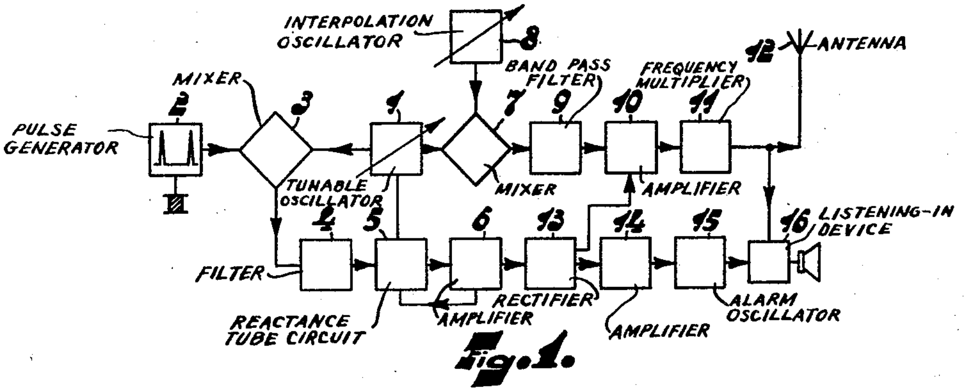
Figure 2:
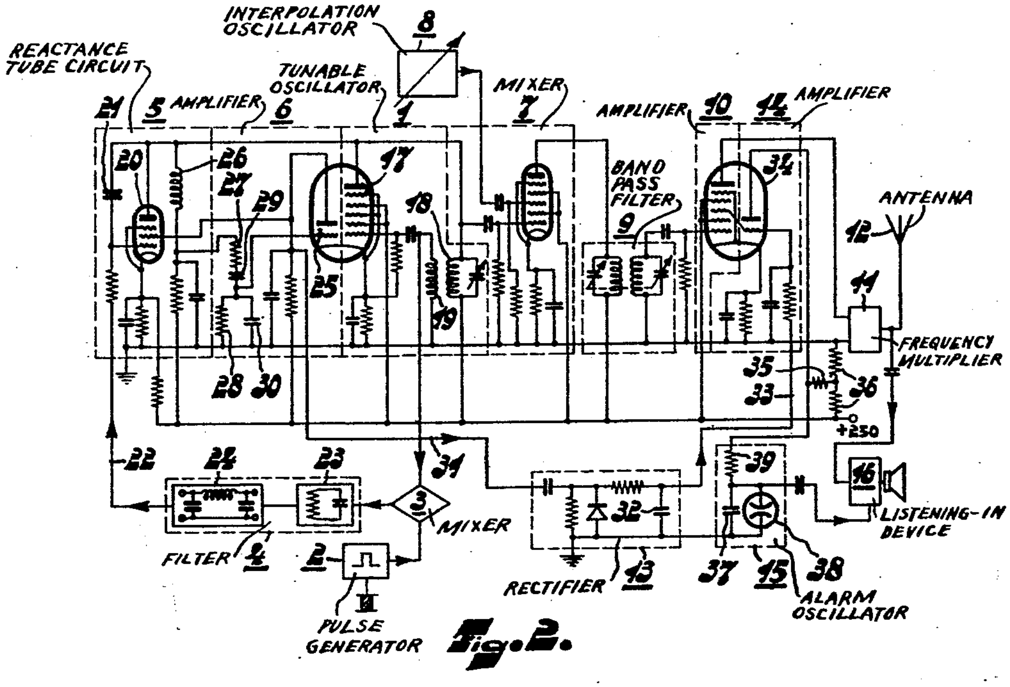

The invention will now be described with reference to the accompanying drawing, in which:

Fig. 1 is a block schematic diagram of a transmission arrangement according to the invention; and Fig. 2 is a schematic diagram of a transmission arrangement according to the invention in greater detail.

In Fig. 1, the reference numeral 1 designates a high-frequency oscillator capable of being tuned in a band of, say, 1.5 to 4 megacycles per second and the reference numeral 2 designates a crystal-controlled pulse generator which generates short pulses (duty cycle, for example, 1/100) at a repetition frequency of, say, 50 kilocycles per second. To stabilize the oscillator frequency at a harmonic of the pulse frequency the oscillator- and pulse-voltage are supplied to a mixer stage 3 which is normally cut off and is caused to become conductive only by the pulses, and which acts as a phase detector. After integration and smoothing by means of a filter 4 the output voltage of the phase detector 3 provides an AFC-voltage by which a reactance tube circuit 5, which is coupled to a frequency-determining circuit of the oscillator 1, is controlled in a manner such that the oscillator frequency corresponds accurately with, say, the fiftieth harmonic of the pulses, provided that the oscillator 1 was initially tuned to 2.5 megacycles per second with an accuracy of several kilocycles per second. The AFC-arrangement thus "catches" automatically and locks the oscillator frequency at the desired component of the pulse spectrum.

To cause the AFC-arrangement to become effective even in the case of larger initial differences of the oscillator frequency from the desired frequency use is made of a search voltage generator of the kind described in United States Patent No. 2,572,343, issued October 23, 1951 to Hugenholtz. In the circuit arrangement concerned the reactance tube together with a supplementary amplifier tube 6 constitutes a search voltage generator, here a resistance-capacity (RC) oscillator which generates in the absence of stabilization only, and in this case generates a sinusoidal low frequency search voltage (for example 2 cycles per second). The low frequency search voltage varies the anode current of the reactance tube and in accordance therewith the tuning of the oscillator 1 until automatic catching and hence stabilization occurs, whereupon the search voltage generator 5, 6 becomes inoperative.

The transmitter cascade succeeding the transmission oscillator 1 comprises a mixer stage 7 for changing the oscillator frequency by an amount which is given by an adjustable interpolation oscillator 8. The output circuit of the mixer stage 7 comprises a band-pass filter 9 for selection of the desired frequency, which upon amplification (10) and, if required, frequency multiplication and/or amplitude modulation (11) is fed to an antenna 12 connected to the output of the transmission cascade.

To prevent transmission of non-stabilized transmitting frequencies the search voltage generator 5, 6 has connected to it a rectifier 13. The output voltage of said search generator, which is set up during searching only, cuts off the amplifier 10. In additon, upon amplification (14) the rectified test voltage releases an alarm oscillator 15, which is coupled to a listening-in device 16 connected to the transmitter output, in order to render the cut-off condition of the transmitter audible to the operating staff.

Fig. 2 is a transmitter of the type of Fig. 1 in which all the elements which are of importance for an understanding of the present invention are shown in detail. The parts corresponding with those shown in Fig. 1 are designated by like reference numerals, which, however, are underlined.

A high-frequency oscillator 1 comprises a back-coupled hexode tube 17 having a tunable anode circuit 18 and has a reaction coil 19 included in its control-grid circuit. The anode of tube 17 is connected to the anode of a pentode 20, which forms part of a normally designed reactance tube arrangement 5, which has a feedback capacitor 21 included between its anode and control grid. The control grid of the reactance tube 20 has the AFC-voltage required for the frequency stabilization of the high-frequency oscillator 1 supplied to it by means of a lead 22. The said AFC-voltage is obtained by mixing in a mixer 3 the voltage set up at the control grid of tube 17 of the oscillator 1 with a pulse voltage taken from a crystal-controlled pulse oscillator 2. The mixer 3 acts as a phase detector and supplies an AFC-voltage through a filter 4 which comprises an integrating network 23 and a low-pass filter 24. The AFC-voltage, is constituted by a direct current voltage if the high-frequency oscillator 1 is stabilized, and, if stabilization fails, by an alternating current voltage, the frequency of which is equal to the frequency difference between the oscillator voltage and the spectrum component next in frequency.

For various reasons, such as preventing instabilities of the AFC-circuit, the filter 4 is proportioned such that only comparatively low difference frequencies, for example not exceeding several hundreds of periods per second, are passed on substantially unattenuated. These frequencies effect frequency modulation of the high-frequency oscillator 1 by means of the reactance tube arrangement 5 until the catching point is passed, whereupon locking of the oscillator frequency at a higher harmonic from the pulse spectrum of the pulse generator 2 automatically ensues.

To enlarge the catching range of the AFC-circuit use is made of a search voltage generator which is constituted by a reactance tube arrangement 5 together with an auxiliary triode 25, which triode forms the triode part of a triode-hexode 17, 25. The anode of the reactance tube 20 is connected to the control-grid of the triode 25 through a high-frequency choke 26 and a phase shifting network comprising resistors 27, 28 and capacitors 29, 30, the triode anode being coupled back to the screen grid of the reactance tube 20. The pentode 20 and the triode 25 thus jointly constitute an RC-oscillator of known type for the production of very low frequencies and comprising a phase-shifting network 27 to 30 as the frequency-determining element (Wien bridge oscillator). This RC-oscillator generates only if the high-frequency oscillator 1 is not locked at a spectral component, since in this case the reactance tube 20 is insensitive to variations of the screen grid voltage, that is, this voltage causes substantially no variation of the anode voltage as would be required to make the RC-oscillator generate. Due to the attendant variation of the apparent reactance of the reactance tube circuit 5, a variation of the screen grid voltage would cause a variation of the oscillator frequency, which is prevented by the frequency-stabilizing AFC-circuit, so that the action of the screen grid voltage variation upon the anode current of the reactance tube 20 is compensated for. In other words, in the locked condition the reactance tube has such a high degree of negative feedback that the action of its positive feedback through the tridoe 25 is counteracted and the RC-oscillator is inoperative.

However, in the absence of locking, the mutual conductance of the reactance tube circuit 5, and hence the frequency of the high-frequency oscillator 1, varies in the rhythm of the oscillations produced by the RC-oscillator and said high-frequency oscillator starting with the tuning frequency of the anode circuit 18 searches a frequency band of, say, approximately 30 kilocycles per second, until catching and locking occurs.

The stabilized oscillator frequency set up across the anode circuit 18 is supplied to the transmitter cascade in sequence with the high-frequency oscillator 1 and beginning with the hexode mixer 7. For the purpose of frequency changing the oscillator frequency is supplied to the first control-grid of the hexode mixer 7; the second control-grid of said hexode which has a stable, continuously or stepwise adjustable interpolation oscillator 8 connected to it. Through a band-pass filter 9, which is tuned thereto and through the amplifier 10 comprising a hexode tube, the changed frequency is supplied to stage 11 (not shown in detail) of the transmitter cascade, to which the antenna 12 is connected.

To prevent transmission of unstabilized transmission frequencies, that is, during operation of the RC-oscillator 5, 6, the search voltage set up at the anode of the auxiliary triode 25 is supplied through a lead 31 to a rectifier 13 comprising an output capacitor 32. The negative voltage set up across it is supplied through a lead 33 to the control grid of a triode of the direct current voltage amplifier 14 in a triode-hexode tube 34 and to the second control grid of the hexode part of the tube 34, said two control grids being directly interconnected. Both the hexode part and the triode part of the tube 34 are thus cut off and prevent transmission oscillations from being supplied through the hexode amplifier 10 to stage 11 of the transmitter cascade and to the antenna 12; and also considerably increase the potential of the triode which is connected to a potentiometer 36 through an anode resistor 35. The triode anode has connected to it an audio frequency sawtooth voltage oscillator 15, which acts as an alarm oscillator and which comprises a relaxation capacitor 37, and in parallel-combination a glow discharge tube 38 and a series resistance 39. When the triode amplifier 14 is not cut off its anode voltage is not sufficient for the glow discharge tube 38 to start; however, as soon as the triode amplifier 14 is cut off by the rectified search voltage, and hence the anode potential is increased, the voltage supplied to the glow discharge tube oscillator 15 is sufficiently high for the latter to strike periodically. The audio frequency voltage thus set up across the relaxation capacitor 37 is supplied to the low frequency part of a listening-in device (control receiver) 16 which is connected to the transmitter output and inoperation of the transmitter is thus indicated to the operating staff by the production of an alarm tone.

Obviously, the alarm oscillator of the type described may be replaced by any other audio frequency oscillator adapted to be released by the search voltage. However, the glow discharge tube oscillator 15 described is preferred to usual amplifier tube oscillators in view of its simplicity.

It is to be understood that the invention is not limited to the details disclosed but includes all such variations and modifications as fall within the spirit of the invention and the scope of the appended claims.

What is claimed is:

1. Transmission apparatus comprising a controllable transmission frequency oscillator, automatic frequency control means for stabilizing said oscillator with respect to a reference oscillation, search voltage generating means coupled to said automatic frequency control means for producing a search voltage and for varying the frequency of said oscillator in the absence of stabilization, means for amplifying the output oscillation of said oscillator, and means coupled to said last-mentioned means and responsive to said search voltage for blocking said last-mentioned means in the absence of stabilization.

2. Transmission apparatus as claimed in claim 1, wherein said amplifying means comprise an amplifying tube having a grid and said blocking means comprises a rectifier having an input circuit and an output circuit, said input circuit being coupled to said search voltage generating means and said output circuit being coupled to said grid.

3. Transmission apparatus as claimed in claim 2, further comprising an audio frequency alarm oscillator comprising a glow discharge tube, means for coupling said alarm oscillator to said search voltage generating means whereby said alarm oscillator is responsive to said search voltage in the said absence of stabilization, and listening-in means coupled to said alarm oscillator and to the output of said amplifying means.

4. Transmission apparatus comprising a controllable transmision frequency oscillator, said oscillator comprising a first electron discharge tube having an anode, automatic frequency control means for stabilizing said oscillator with respect to a reference oscillation, search voltage generating means coupled to said automatic frequency control means for producing a search voltage and for varying the frequency of said oscillator in the absence of stabilization, said search voltage generating means comprising a reactance tube having a control grid, a screen grid and an anode, means for applying the automatic frequency control voltage of said first-mentioned means to said control grid, a second electron discharge tube having a control grid and an anode, a phase shifting network, means including said phase shifting network for coupling the anode of said reactance tube to the control grid of said second tube, means for coupling the anode of said reactance tube to the anode of said first tube and means for coupling the anode of said second tube to the screen grid of said reactance tube whereby said absence of stabilization produces variation in the mutual conductance of said reactance tube thereby producing said search voltage and varying the frequency of said oscillator, means for amplifying the output oscillation of said oscillator, and means coupled to said last-mentioned means and responsive to said search voltage for blocking said last-mentioned means in said absence of stabilization.

5. Transmission apparatus comprising a controllable transmission frequency oscillator, said oscillator comprising a first electron discharge tube having an anode, automatic frequency control means for stabilizing said oscillator with respect to a reference oscillation, search voltage generating means coupled to said automatic frequency control means for producing a search voltage and for varying the frequency of said oscillator in the absence of stabilization, said search voltage generating means comprising a reactance tube having a control grid, a screen grid and an anode, means for applying the automatic frequency control voltage of said first-mentioned means to said control grid, a second electron discharge tube having a control grid and an anode, a phase shifting network, means including said phase shifting network for coupling the anode of said reactance tube to the control grid of said second tube, means for coupling the anode of said reactance tube to the anode of said first tube and means for coupling the anode of said second tube to the screen grid of said reactance tube whereby said absence of stabilization produces variation in the mutual conductance of said reactance tube thereby producing said search voltage and varying the frequency of said oscillator, means for amplifying the output oscillation of said oscillator comprising an amplifying tube having a grid, and means coupled to said last-mentioned means and responsive to said search voltage for blocking said last-mentioned means in said absence of stabilization, said blocking means comprising a rectifier having an input circuit and an output circuit, means for coupling the anode of said second tube of said search voltage generating means to said input circuit and means for coupling said output circuit to the grid of said amplifying tube.

6. Transmission apparatus comprising a controllable transmission frequency oscillator, said oscillator comprising a first electron discharge tube having an anode, automatic frequency control means for stabilizing said oscillator with respect to a reference oscillation, search voltage generating means coupled to said automatic frequency control means for producing a search voltage and for varying the frequency of said oscillator in the absence of stabilization, said search voltage generating means comprising a second electron discharge tube having a control grid, a screen grid and an anode, means for applying the automatic frequency control voltage of said first-mentioned means to said control grid, a third electron discharge tube having a control grid and an anode, a phase shifting network, means including said phase shifting network for coupling the anode of said second tube to the control grid of said third tube, means for coupling the anode of said second tube to the anode of said first tube and means for coupling the anode of said third tube to the screen grid of said second tube whereby said absence of stabilization produces variation in the mutual conductance of said second tube thereby producing said search voltage and varying the frequency of said oscillator, means for amplifying the output oscillation of said oscillator comprising a fourth electron discharge tube having a plurality of grids, means for applying the said output oscillation to one of said plurality of grids, means coupled to said amplifying means and responsive to said search voltage for blocking said amplifying means in said absence of stabilization, said blocking means comprising a rectifier having an input circuit and an output circuit, means for coupling the anode of said third tube to said input circuit and means for coupling said output circuit to another of said plurality of grids of said fourth tube, an audio frequency alarm oscillator comprising a glow discharge tube, means for coupling said alarm oscillator to said output circuit whereby said alarm oscillator is responsive to said search voltage in said absence of stabilization, and audio detecting means coupled to said alarm oscillator and to the output of said amplifying means.

7. Transmission apparatus comprising a controllable transmission frequency oscillator, automatic frequency control means for stabilizing said oscillator with respect to a reference oscillation, search voltage generating means coupled to said automatic frequency control means for producing a search voltage and for varying the frequency of said oscillator in the absence of stabilization, means for amplifying the output oscillation of said oscillator comprising a first electron discharge tube having a plurality of grids, means for applying the said output oscillation to one of said plurality of grids, means coupled to said amplifying means and responsive to said search voltage for blocking said amplifying means in said absence of stabilization, said blocking means comprising a rectifier having an input circuit and an output circuit, means for applying said search voltage to said input circuit, amplifying means comprising a second electron discharge tube having a control grid and an anode, means for coupling said output circuit to another of said plurality of grids of said first tube and to the control grid of said second tube, an audio alarm oscillator comprising a capacitor, a glow discharge tube in parallel combination with said capacitor and a resistor connected in series with said parallel combination, means for coupling the anode of said second tube to said resistor whereby said alarm oscillator is rendered operative by the application of said search voltage to the control grid of said second tube thereby to cut off said second tube and to increase the potential on the anode of said second tube to render said glow discharge tube operative, and audio detecting means coupled to said glow discharge tube and to the output of said first-mentioned amplifying means for indicating operation of said alarm oscillator.

References Cited in the file of this patent

UNITED STATES PATENTS

| | | |
|---|---|---|
| 2,287,925 | White | June 30, 1942 |
| 2,434,294 | Ginzton | Jan. 13, 1948 |
| 2,477,428 | Sprague | July 26, 1949 |
| 2,498,089 | Lippman | Feb. 21, 1950 |
| 2,540,333 | Hugenholtz | Feb. 6, 1951 |
| 2,547,890 | Rubin | Apr. 3, 1951 |
| 2,624,005 | Hansen et al. | Dec. 30, 1952 |